United States Patent [19]

van Mil

[11] Patent Number: 4,558,489
[45] Date of Patent: Dec. 17, 1985

[54] METHOD AND APPARATUS FOR DIVIDING SLAUGHTERED POULTRY INTO A BACK HALF AND A FRONT HALF

[75] Inventor: Martinus P. G. van Mil, Boxmeer, Netherlands

[73] Assignee: Stork PMT B.V., Boxmeer, Netherlands

[21] Appl. No.: 553,383

[22] Filed: Nov. 18, 1983

[30] Foreign Application Priority Data

Nov. 18, 1982 [NL] Netherlands ............................ 8204464

[51] Int. Cl.⁴ ............................................. A22C 21/00
[52] U.S. Cl. ................................................ 17/52; 17/11
[58] Field of Search ...................................... 17/11, 52

[56] References Cited

U.S. PATENT DOCUMENTS

| | | | |
|---|---|---|---|
| 3,104,418 | 9/1963 | Segur | 17/11 |
| 3,639,945 | 2/1972 | Duncan et al. | 17/11 |
| 3,675,272 | 7/1972 | Schacht | 17/11 X |
| 4,468,838 | 9/1984 | Sjöström et al. | 17/11 |

Primary Examiner—Willie G. Abercrombie
Attorney, Agent, or Firm—Newton, Hopkins & Ormsby

[57] ABSTRACT

This invention relates to a method and apparatus for dividing a slaughtered bird into a front half 31 and a back half 28, the body 12, prior to and during the cutting operation, being brought into a position wherein the legs are positioned in front of the rest of the body while, prior to and during the cutting operation, the edge portion 26, forming the boundary with the breast, of the opening 27 present between the legs, is pulled downwards, the body being subsequently divided into two halves starting just above said edge portion 26.

15 Claims, 6 Drawing Figures

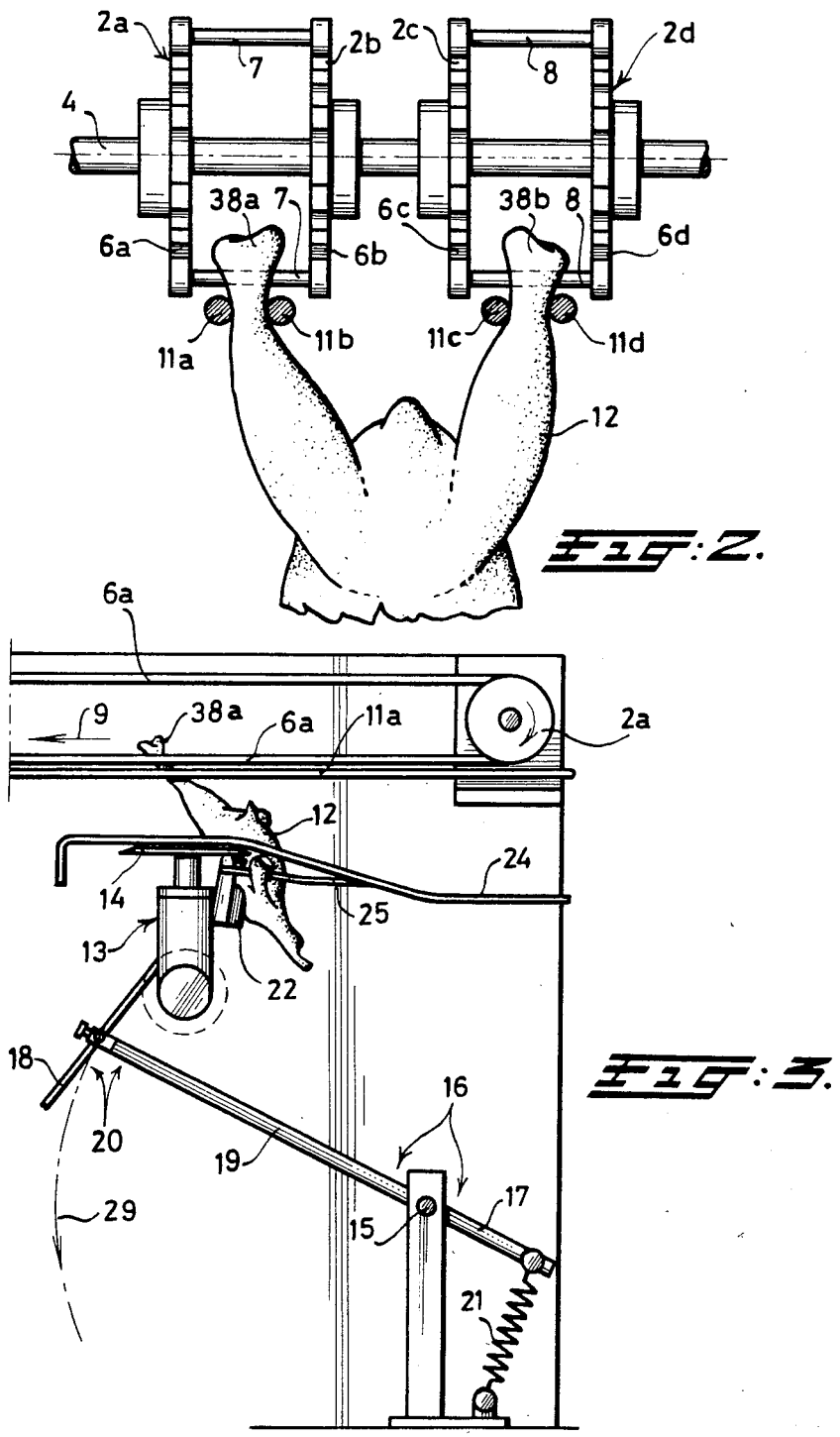

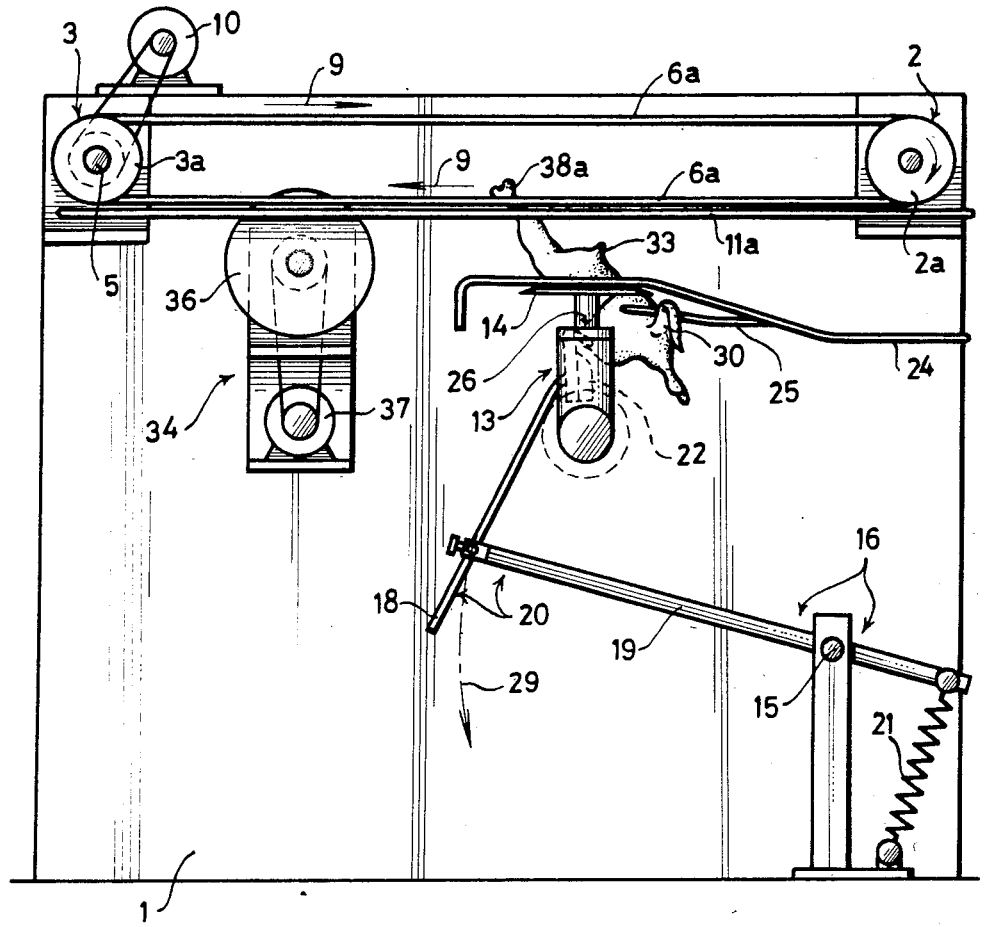
Fig: 4.
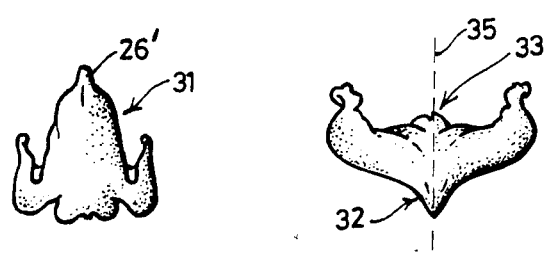
Fig: 5.

METHOD AND APPARATUS FOR DIVIDING SLAUGHTERED POULTRY INTO A BACK HALF AND A FRONT HALF

BACKGROUND OF THE INVENTION

The present invention relates to a method of dividing the body of a slaughtered bird into a back half and a front half, said body being suspended by its legs from a conveying means, being advanced with its breast forwardly directed and being cut to pieces during its travel.

Methods of this type have been used in the art. These known methods are, however, unsuitable for dividing the body of a slaughtered bird in a simple manner into a front half consisting of the breast part and the major portion of the back part of the body, and a back half consisting of two back-quarters each comprising a leg, a piece of thigh and a portion of the back, which rear part is subsequently to be divided into two separate quarters, if so needed. This is due to the fact that dividing the body of a slaughtered bird into a front half and a back half in the manner as desired, is rendered difficult in that between the legs of the body suspended by its legs in the usual manner there is a portion of both the breast and the back, an opening being bounded by said portion in conjunction with the legs. If consequently, the suspended body is divided into a front half and a back half by means of a simple cutting operation, this will result in the breast part at the said opening becoming part of the cut-off back half, which is not desirable, instead of becoming part of the cut-off front half. In order to prevent this from occurring, the known methods provide therefor a cutting, in a first step, of the area located centrally between the legs in longitudinal direction, and a cutting, in a following complex step, of each side part so obtained, into quarters. In such case, the parts resembling the said quarters often contain the undesirable rear portion of the breast part. Therefor, these known methods have the drawbacks of being complicated and of thus rendering it impossible to obtain the said, commercially attractive, front half and the remaining back half which consists of two easily separable likewise commercially attractive back-quarters, not containing a portion of the breast part.

SUMMARY OF THE INVENTION

It is a main object of the present invention to overcome the shortcomings of the known methods.

To this end in the present method, prior to and during the cutting operation, the body is brought into an inclined position such that, viewed in the direction of travel, the legs are positioned in front of the rest of the body, while, prior to and during the cutting operation, the edge portion, forming the boundary with the breast, of the body opening present between the legs is pulled downwards with respect to the thighs thereof, and subsequently the body is horizontally divided into two halves starting just above said edge portion. This results in a first half of the body comprising the complete breast, and a back half of the body comprising two back-quarters. These halves are commercially attractive portions and are, in addition, very well suited for further processing.

Preferably the back half of the body suspended from the conveying means is supported at least in the area where the cutting operation is performed, thus preventing the undesirable effect of damaging the body during or after cutting.

According to the invention, it is possible to obtain in a simple manner parts of the composition as set forth herebefore in that, in a subsequent step, the cut-off half of the body suspended from the conveying means is divided vertically between the legs.

According to the invention, an apparatus suitable for carrying out the method of the invention consisting of a conveyor system connected to a frame and adapted for advancing the body of a slaughtered bird to be suspended by its legs, said body passing with its breast in the direction of travel through a cutting apparatus which is joined to the frame and where it is divided into two parts, comprises an arm which is pivotably mounted to said frame and which, on the supply side of the cutting apparatus, is resisted in its movement by a resistance device below the legs of the body to be advanced, said arm being capable of rotation about a spindle shaft perpendicular to the direction of travel in a vertical plane centrally between the legs from a high position of the free end of the arm, as determined by an abutment of the frame to a lower position thereof and farther removed from the supply side during displacement of the body against at least the free end of said arm, the free end being provided with a gripping element engaging, during downward displacement thereof, the edge portion, forming the boundary of the breast, of the opening present between the legs, first cutting members of the cutting apparatus, dividing the body horizontally into two halves above said gripping element. In this, simple, embodiment of the apparatus according to the present invention, the forward movement of the body against the free end of the arm which is in its high position and the effect of the resistance device, cause the body of the bird on its way to the cutting apparatus, to be tilted with the legs forwardly directed, and the said edge portion of the opening located between the legs to be pulled underneath the cutting plane of the cutting members in a manner so that the cutting members do not touch the breast part. After the body has been divided, there are obtained a back half of the body and a front half thereof comprising the complete, undamaged breast.

In order to obtain a simple embodiment, the gripping element preferably consists of a downwardly inclined projection, provided on the supply side of the body, said projection extending over the said edge portion into the body during arm rotation.

Preferably, fixed to the arm below the gripping element there is a scoop-shaped element capable of partially receiving the breast of the body. This facilitates the positioning of the body, while simultaneously preventing the breast from being damaged during the cutting operation. In addition, the result of this measure is that, during the reverse movement of the arm after cutting, the cut-off front half of the body, which at this point has not been dropped yet, is thrown off the cutting members, so that during collection of such front halves an obstruction of, in particular, the cutting apparatus is prevented.

The resistance device may be formed by a spring connected to the arm on the one side and to the frame on the other side, providing a torque which is opposed with respect to the torque of the free end, so that it urges the free end into its high position. While the body is traveling toward the cutting apparatus, the spring provides a resistance such, that the body is tilted. A further advantage of this embodiment is that returning the arm to the high position of the free end thereof does not require any complex drive means.

Instead of spring means, it is also possible to use a weight connected to the arm.

Preferably, the apparatus is provided with a cam which is rotatably driven about a spindle shaft perpendicular to the direction of travel in synchronism with the conveyance of a series of bodies of slaughtered birds, and which by pushing against the arm, returns the free end thereof from the lower position to the higher position thereof. This extremely increases the processing speed of the apparatus, while preventing the free end of the arm from returning too late to the high, initial position and from incorrectly engaging the next body arriving.

Especially in the embodiment of the apparatus having the cam acting upon the arm, there may occur too high accelerations and/or oscillations, particularly when reaching the high position of the free arm end as determined by the abutment. On the one hand, this may limit the processing speed of the apparatus while, on the other hand, it may result in damage to the construction with the arm. For this reason, the apparatus is preferably provided with a damping device coupled to the arm.

In addition, the pivoting point of the arm is preferably located at a level above the cutting apparatus. It is then possible to fully utilize the space below the cutting arrangement for collecting the cut-off front halves of the bodies, while excluding the possibility of polluting and obstructing the arm construction due to dropping body pieces.

The apparatus of the present invention is preferably equipped with a guide arrangement providing a longitudinal passage for the body running substantially in the direction of travel, in which case, in the direction of travel, the width of the passage gradually decreases and the borders of the passage rise to such an extent that in the area where the body is cut, the thigh bones of the body project laterally over the passage borders and the body assumes an inclined, backwardly direction position. Such a guide arrangement can independently act as the resistance device for bringing the body into an inclined position. On the other hand, the guide arrangement can also be used with a view to facilitating the tilting of the body under the influence of a resistance device formed by another means and the lateral positioning of said body.

The apparatus is preferably provided with a guide system extending over the first cutting members and adapted to support the suspended cut-off half of the body. This prevents the suspended cut-off back half of the body from being damaged by the cutting members.

According to another feature of the present invention, the cutting apparatus comprises a second assembly of cutting members which, viewed in the direction of travel, are disposed past the first cutting members, and which divide the suspended body half cut off by the first cutting members, vertically centrally between the legs. This embodiment of the apparatus according to the invention affords obtaining in a simple manner, backquarters each consisting of a leg, a thigh portion and a back portion, whereas the remaining front half of the body comprises the entire breast which can be sold in one piece.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

SURVEY OF THE DRAWINGS

FIG. 1 is a side view of an embodiment of the apparatus according to the invention;

FIG. 3 is a side view of a portion of the apparatus of FIG. 1 in another embodiment;

FIG. 4 is a side view of the same apparatus in yet another embodiment;

FIG. 5 illustrates the body halves of a slaughtered bird as obtained after a first cutting operation of the apparatus shown in the preceding figures;

DESCRIPTION OF THE PREFERRED EMBODIMENTS

Figure 2:
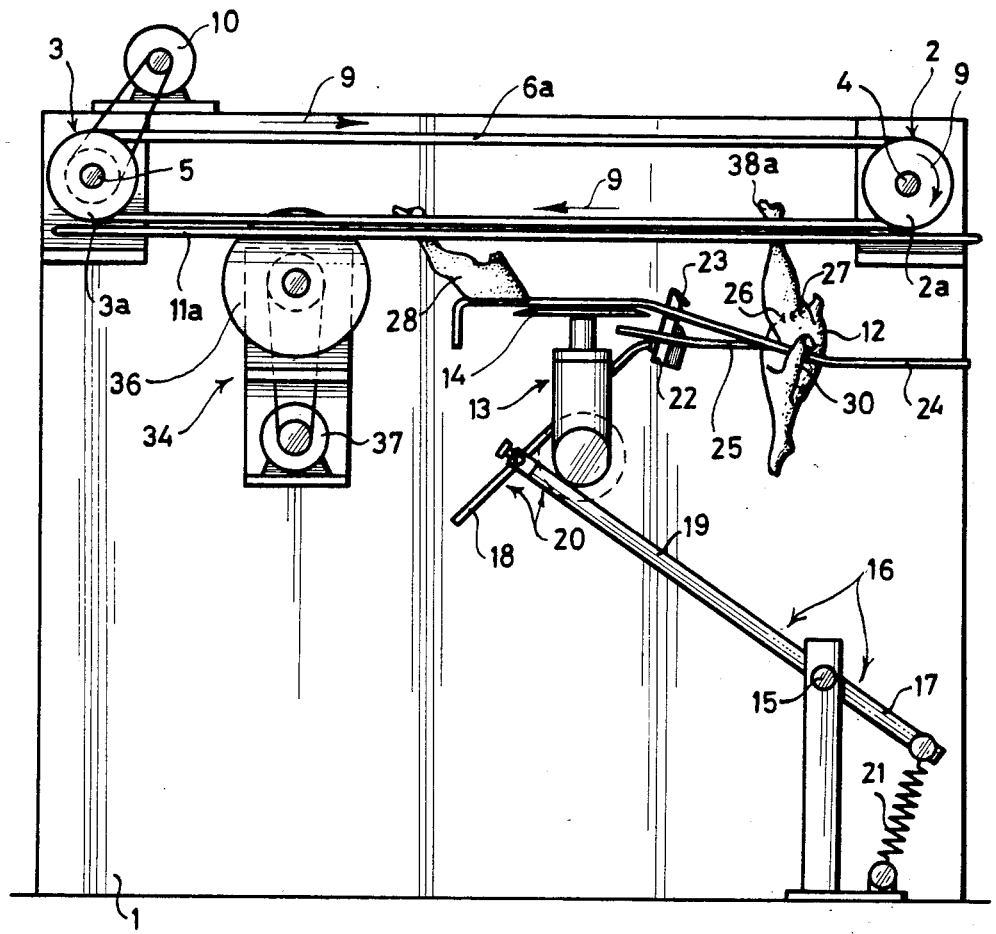
FIG. 2 is an enlarged front view of a portion of the conveyor system of FIG. 1.

Referring now to FIG. 1 an embodiment of the cutting apparatus according to the invention comprises a frame, mainly schematically, represented by a wall, to which there is fixed a conveyor arrangement (a front view of which is partially shown in FIG. 2). The conveyor arrangement comprises two gear-wheel assemblies 2, 3 each consisting of four gear-wheels mounted on a common shaft 4 and 5, respectively (the shaft 4 and the gear-wheels 2a through 2d being shown in FIG. 2). The gear-wheels of the one assembly are located opposite the respective gear wheels of the other assembly, the gear wheels of each opposite assembly being interconnected by means of a chain 6a to 6d, respectively. Between the links of the pair of chains 6a and 6b of the pair 6c and 6d there are provided, at regular intervals in the longitudinal direction of the chains, pins 7 and 8, respectively. The gear wheel assemblies 2, 3 and the chains 6, are driven in the direction indicated by the arrows 9, by means of a drive coupled to the gear-wheel assembly 3.

At a small distance underneath the pins 7, 8 there are mounted to the frame, between the chain pairs 6a, 6b and 6c, 6d, respectively, guide rods 11a, 11b and 11c, 11d, respectively, which run parallel to the chains, so that the legs of a slaughtered bird body 12, which is in particular a chicken ready for the frying pan, can be passed with little clearance between the respective guide rod assemblies, the dull ends 38a, 38b of the legs being supported on the respective guide rods and being pushed by the guide pins 7, 8 in the direction of the arrows 9, from a supply point located in the area of the gear-wheel assembly 2 in the direction of a discharge point located in the area of the gear-wheel assembly 3. It should be noted that the body 12 travels with the breast facing the gear-wheel assembly 3, (FIG. 2 therefor shows a view of a portion of the back of the body of a slaughtered bird).

Mounted to the frame 1 is also a cutting apparatus consisting of two juxtaposed cutting members 13, each provided with a disk-shaped cutter 14, rotated by means of a drive (not shown). The cutters rotate in opposite directions in the same horizontal plane and are located at a short distance on either side of the vertical plane located centrally between the chains 6b and 6c. This plane will be designated hereinafter as central vertical plane.

In the central vertical plane, there is provided a lever 16 which is rotatable about a spindle shaft 15 that is fixed with respect to the frame 1 and which consists of an arm member 17 and an arm member 20 consisting of two parts 18, 19 adjustable with respect to one another. The lever 16 is urged against an abutment (not shown), into the rest or initial position (FIG. 1) under the influence of a spring 21 which at one end is connected to the extremity of the arm member 17 and at the other end, in a location below the spindle shaft 15, is connected to the frame 1.

The free end of the arm 20, i.e. the uppermost end of the arm part 18, is provided with a scoop-shaped member 22 which is open on the supply side as well as on the lower and upper side. The upper edge of said scoop-shaped member 22 is provided, on the supply side, with an inclined downwardly directed, relatively narrow projection 23.

Provided on the frame 1 are, in symmetric relation with respect to the central vertical plane, two guide rods, as at 24, forming a passage means for the body 12, the passage width gradually decreasing from the supply side in the direction of travel and gradually rising up to the cutters 14, to horizontally continue from this point on at a short distance above the cutters. A wing catch or check rod 25 is provided underneath a section of each guide rod 24.

The lever 16 and/or guide arrangement formed by the guide rods 24 are/is provided with a view to positioning an arriving body 12 in such a manner with respect to the cutting members 14 that the edge portion 26 of the body, which forms the boundary of the opening 27, present between the legs, with the breast part, is brought underneath the cutting plane of the cutting-members 14 so that dividing the body 12 results in a back half, referred 28, comprising the legs, the thighs and a portion of the back, and a front half separated therefrom and comprising the complete breast. The front half cut off from the back half 28 is not illustrated and may be considered as having been collected already.

Said object is attained according to the invention in that during conveyance the body 12 comes into abutment with the free end of the arm 20 provided with the scoop-shaped member 22, the projection 23 extending over the edge portion 26 of the opening 27 of the body 12 and the forward movement of the lower part of the body 12 being slowed down under the influence of the spring 21. As a result, the body 12 will be inclined and the edge portion 26 will be engaged between the transition of the scoop-shaped member 22 and the projection 23, so that during the downward movement of the arm 20 the edge portion 26 is pulled between the cutter means 14 and underneath the cutting face of the cutters 14 (thus resulting in the situation illustrated in FIG. 3). The cutting members 14 will then divide the body 12 according to the line desired, the breast part not being touched by the cutting members 14.

Referring now to FIG. 4 as the body continues its travel, the arm 20, will continue its downward movement as defined by the arrow 29, so that the edge portion 26 is pulled further in the direction of travel and further downwardly, thus further tilting the lower part of the body with respect to the back half supported on the guide rods 24, whereby the body can be cut easily and without the occurrance of undesirable damage to the parts so cut. During this situation, the wing parts 30, will be tilted somewhat. In order to prevent these wing parts from being damaged by the cutters 14, they are received by check rods 25 running between the trunk and the wing parts 30. This arrangement also provides extra protection against damage to the back caused by the cutters.

As soon as the front half of the body has been separated from the back half (vide 28 in FIG. 1), said back half will continue its travel over the guide rods 24, thus precluding damage thereof caused by the cutting members 14. At the same time, the lever 16 will return to its initial position (FIG. 1), unter the influence of the springs 21, the cut-off front half, when dropping, being thrown off by the scoop-shaped member 22 of the cutting members 13. As a result, in practical terms, obstruction of, particularly, the cutting members is prevented, and the front half can be collected and removed in an easier manner.

Referring now to FIG. 5 the halves obtained by the processing steps as described hereinbefore, the front half indicated by reference numeral 31 shows the breast part whose portion 26′ is the edge portion mentioned hereinbefore, which is pulled underneath the cutters by means of the projection 23. The rear half is indicated by reference numeral 32 illustrating the back side thereof. In the complete body, the portion 33 is opposite the edge portion 26′.

The back half actually consists of two back-quarters each comprising a leg, a piece of thigh and a portion of the back. In a preferred embodiment, these quarters are separated from each other by means of another cutting member 34 (FIG. 4) on the line 35, so that two individual, commercially attractive, backquarters are obtained. Consequently, the cutting member 34 comprises a disk-shaped cutter 36 disposed in the central vertical plane and rotatably driven by a drive mechanism 37 (FIG. 4).

It should be noted that for the purpose of tilting the body 12 and pulling the edge portion 26 underneath the cutting face of the cutter means 14, other solutions are conceivable within the scope of the present invention. They may or may not comprise the use of guide rods 24, while in-stead of the lever 16 it would be possible to use pull rods which may be coupled to the drive means and which may be active, for example pneumatically operated, elements.

Figure 6:
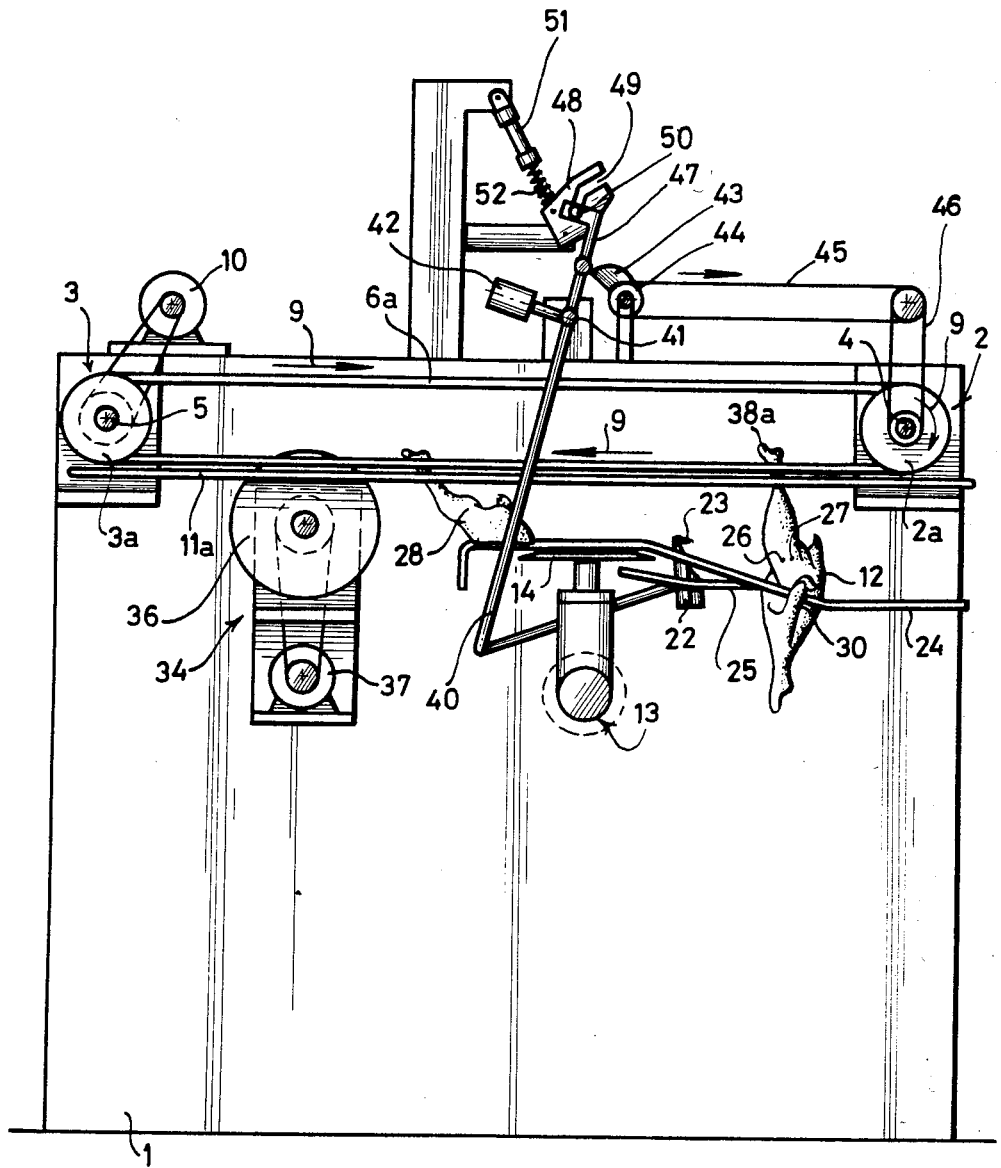
FIG. 6 is a preferred embodiment of the apparatus according to the invention.

Although the embodiment of the apparatus of the invention as shown in FIGS. 1 to 4 is a relatively simple and inexpensive embodiment, the embodiment of FIG. 6 is to be preferred because of its higher processing speed and the larger collecting space underneath the cutting apparatus for the cut-off front halves of the body of a slaughtered bird.

In the preferred embodiment of the apparatus according to the present invention (as illustrated in FIG. 6), the arm, in the form of a bracket 40 substantially has a U-shape having legs of unequal lengths. The scoop-shaped member 22 with the projection 23 is attached to the free end of the short leg of the bracket 40. The short bracket leg is guided between the pair of cutting members 13, so that, during displacement of the short leg, the scoop 22 can move to a point underneath the cutters 14. The long leg of the bracket 40 is rotatable about a spindle 41 which is perpendicular to the plane of the drawing. The distance between the legs is at least such that the long leg is not in contact with the rear parts 28 of the bodies.

A weight 42 is fixed to the bracket 40 at a location such that the bracket 40 is urged into the initial position as illustrated. Upon engagement of the projection 23 about the edge portion 26 of the opening 27 of the next body 12 arriving, the projection 23 will be brought into an inclined direction underneath the cutters 14 during the travel of the body 12, thus tilting the front half of the body (just as in FIGS. 3 and 4). A brake cylinder 51 having a spring 52 is pivotably connected with each end to the frame 1 and the plate 48, respectively.

It should be noted that within the scope of the invention an embodiment is also conceivable wherein the portion as shown having the weight 42, the cam 43 and the damping device with brake cylinder 51, is disposed below the level of the cutter means 14 and may be coupled to the lever 16 (see the embodiment of FIG. 1).

Although the present invention has been shown and described in connection with some preferred embodiments thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A method for dividing the body of a slaughtered fowl transversally into a back half consisting of two back quarters each comprising a leg, a piece of thigh, and a portion of the back and a front half consisting of the breast part and a major portion of the back part of the body, said body suspended by its legs from a conveying means, being advanced with its breast forwardly directed in the direction of conveyance and being cut to said halves during its conveyance by a cutting operation, in which, prior to and during said cutting operation, the body is brought into an inclined position relative to said direction of conveyance such that the legs are positioned in front of the rest of the body, while a boundary with the breast forming edge portion of the rear opening of the body present between the legs is pulled away from between the legs, and that said cutting operation is performed in a plane extending between said pulled away edge portion and the thighs.

2. A method according to claim 1, in which the back half of the body suspended from the conveying means is supported at least in the area where the cutting operation is performed.

3. A method according to claim 1, in which the cut-off half of the body suspended from the conveying means is cut by a subsequent cutting operation in a plane extending vertically between the legs.

4. An apparatus suitable for dividing the body of a slaughtered bird into a back half and a front half comprising a conveyor system connected to a frame and adapted for advancing the body of a slaughtered bird to be suspended by its legs, said body passing with its breast in the direction of travel through a cutting apparatus which is joined to the frame and where it is divided into pieces, comprising an arm which is pivotably mounted to said frame and which, on the supply side of the cutting apparatus, is resisted in its movement by a resistance device above the legs of the body to be advanced, said arm being capable of rotation about a spindle shaft perpendicular to the direction of travel in a vertical plane centrally between the legs from a high position of the free end of the arm as determined by an abutment of the frame, to a lower position thereof and farther removed from the supply side during displacement of the body against at least the free end of said arm, the free end being provided with a gripping element engaging, during downward displacement thereof, the edge portion, forming the boundary of the breast, of the opening present between the legs and the first cutting members of the cutting apparatus dividing the body horizontally into two halves above said gripping element.

5. An apparatus according to claim 4, wherein the gripping element consists of a downwardly inclined projection provided on the supply side of the body, said projection extending over said edge portion into the body during rotation of the arm.

6. An apparatus according to claim 4, wherein a scoop-shaped element is fixed to the arm below the gripping element and capable of partially receiving the breast of the body.

7. An apparatus according to claim 4, wherein the resistance device consists of a spring connected on the one side to the arm and on the other side to the frame and providing a torque which is opposed with respect to the torque of the free end, so that it urges the free end into its high position.

8. An apparatus according to claim 4, wherein the resistance device consists of a weight fixed to the arm and providing a torque opposed with respect to the torque of the free end, so that it urges the free end into its high position.

9. An apparatus according to claim 8, comprising a cam which is rotatably driven about a spindle shaft perpendicular to the direction of travel in synchronism with the conveyance of a series of bodies and which by pushing against the arm, returns the free end thereof from the lower position to the higher position thereof.

10. An apparatus according to claim 9, wherein a damping device is coupled to the arm.

11. An apparatus according to claim 4, wherein the pivoting point of the arm is located at a level above the cutting apparatus.

12. An apparatus according to claim 4, comprising a guide arrangement providing a longitudinal passage for the body running substantially in the direction of travel, the width of the passage gradually decreasing in the direction of travel to such an extent and the borders of the passage rising to such an extent that in the area where the body is cut, the thigh bones of the body laterally project over the passage borders and the body assumes an inclined, backwardly directed position.

13. An apparatus according to claim 4, comprising a guide system extending over the first cutting members and adapted to support the suspended cut-off half of the body.

14. An apparatus according to claim 4, wherein the cutting apparatus comprises a second assembly of cutting members which, viewed in the direction of travel, are disposed past the first cutting members and which divide the suspended half of the body cut off by the first cutting members, vertically centrally between the legs.

15. An apparatus according to claim 4, wherein each of the first cutting members comprises a disc-shaped cutter which cutters are disposed at a short distance from each other and are driven in opposite directions in the same horizontal plane, and which are located respectively on opposite sides of the plane of rotation of the arm.

* * * * *